(12) United States Patent
Fairgrieve et al.

(10) Patent No.: US 9,376,108 B2
(45) Date of Patent: Jun. 28, 2016

(54) VEHICLE STEERING

(71) Applicant: Jaguar Land Rover Limited, Whitley Coventry Warwickshire (GB)

(72) Inventors: Andrew Fairgrieve, Rugby (GB); James Kelly, Dorridge (GB); Daniel Woolliscroft, Birmingham (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/406,129

(22) PCT Filed: Jun. 7, 2013

(86) PCT No.: PCT/EP2013/061838
§ 371 (c)(1),
(2) Date: Dec. 5, 2014

(87) PCT Pub. No.: WO2013/182695
PCT Pub. Date: Dec. 12, 2013

(65) Prior Publication Data
US 2015/0151747 A1    Jun. 4, 2015

(30) Foreign Application Priority Data

Jun. 7, 2012  (GB) .................................. 1210064.0
Aug. 16, 2012 (GB) .................................. 1214651.0

(51) Int. Cl.
*B62D 1/00*   (2006.01)
*B62D 5/00*   (2006.01)
(Continued)

(52) U.S. Cl.
CPC ............... *B60W 30/045* (2013.01); *B60T 7/22* (2013.01); *B60T 8/17555* (2013.01); *B60W 10/04* (2013.01); *B60W 10/12* (2013.01); *B60W 10/18* (2013.01); *B60W 30/143* (2013.01); *B60W 30/18145* (2013.01); *B60T 2201/02* (2013.01); *B60T 2201/16* (2013.01); *B60T 2210/16* (2013.01); *B60T 2260/04* (2013.01); *B60W 10/06* (2013.01); *B60W 10/16* (2013.01); *B60W 10/184* (2013.01); *B60W 2520/14* (2013.01);
(Continued)

(58) Field of Classification Search
USPC ..................................... 701/41, 42, 36, 91, 93
See application file for complete search history.

(56) References Cited

U.S. PATENT DOCUMENTS 5,265,020 A   11/1993 Nakayama
5,514,050 A    5/1996 Buerle et al.
(Continued)

FOREIGN PATENT DOCUMENTS

EP   1355209 A1   10/2003
EP   1752349 A1    2/2007
(Continued)

OTHER PUBLICATIONS

International Search Report for application No. PCT/EP2013/061838, dated Jun. 7, 2013, 4 pages.
(Continued)

*Primary Examiner* — Yonel Beaulieu
(74) *Attorney, Agent, or Firm* — Reising Ethington P.C.

(57) ABSTRACT

A method and system of providing steering in cruise control, in low friction conditions, at low speed and in low range. Speed of individual vehicle wheels is repeatedly and automatically adjusted to ensure that the actual rate of turn of the vehicle approaches the theoretical rate of turn as demanded by the vehicle driver.

21 Claims, 6 Drawing Sheets

(51) Int. Cl.
*B60W 30/045* (2012.01)
*B60T 7/22* (2006.01)
*B60T 8/1755* (2006.01)
*B60W 10/12* (2012.01)
*B60W 30/14* (2006.01)
*B60W 30/18* (2012.01)
*B60W 10/04* (2006.01)
*B60W 10/18* (2012.01)
*B60W 10/06* (2006.01)
*B60W 10/16* (2012.01)
*B60W 10/184* (2012.01)

(52) U.S. Cl.
CPC ...... *B60W2540/18* (2013.01); *B60W 2550/141* (2013.01); *B60W 2550/148* (2013.01); *B60W 2710/0666* (2013.01); *B60W 2710/182* (2013.01); *B60W 2720/10* (2013.01); *B60W 2720/14* (2013.01); *B60W 2720/20* (2013.01); *B60W 2720/28* (2013.01); *B60W 2720/30* (2013.01); *B60W 2720/406* (2013.01)

(56) References Cited

U.S. PATENT DOCUMENTS

| | | |
|---|---|---|
| 6,282,478 B1 | 8/2001 | Akita |
| 7,229,139 B2 | 6/2007 | Lu et al. |
| 7,248,956 B2 | 7/2007 | Erban et al. |
| 7,318,629 B1 | 1/2008 | Sun et al. |
| 7,349,776 B2 | 3/2008 | Spillane et al. |
| 8,195,371 B2 | 6/2012 | Yasui et al. |
| 8,244,445 B2 | 8/2012 | Luehrsen et al. |
| 2004/0044443 A1 | 3/2004 | Eriksson |
| 2005/0171669 A1* | 8/2005 | Sato ............... B60W 30/188 701/51 |
| 2005/0222717 A1 | 10/2005 | Erban et al. |
| 2005/0222731 A1 | 10/2005 | Ghoneim |
| 2006/0076828 A1* | 4/2006 | Lu ............... B60T 8/1755 303/146 |
| 2007/0021875 A1 | 1/2007 | Naik et al. |
| 2007/0169007 A1 | 7/2007 | Hashimoto et al. |
| 2007/0213913 A1 | 9/2007 | Ushiroda et al. |
| 2008/0082243 A1 | 4/2008 | Villella et al. |
| 2009/0037053 A1 | 2/2009 | Yamazaki |
| 2009/0184572 A1 | 7/2009 | Yamada et al. |
| 2009/0255746 A1 | 10/2009 | Boesch |
| 2011/0172883 A1 | 7/2011 | Matsuno et al. |
| 2011/0251749 A1 | 10/2011 | Schwarz et al. |
| 2012/0109458 A1 | 5/2012 | Sidlosky |
| 2012/0116619 A1 | 5/2012 | Tate et al. |
| 2012/0116636 A1 | 5/2012 | Dechamp |
| 2013/0110332 A1 | 5/2013 | Hwang |

FOREIGN PATENT DOCUMENTS

| | | |
|---|---|---|
| EP | 2082936 A2 | 7/2009 |
| GB | 2276683 A | 10/1994 |
| GB | 2357159 A | 6/2001 |
| GB | 2412750 A | 2/2005 |
| GB | 2454337 A | 10/2008 |
| GB | 2494413 A | 3/2013 |
| JP | 11029016 A | 2/1999 |
| JP | 2009210105 A | 9/2009 |
| WO | 2004106101 A1 | 12/2004 |

OTHER PUBLICATIONS

UK Combined Search and Examination Report for corresponding application No. GB1210064.0, dated Sep. 26, 2012, 9 pages.
Combined Search and Examination Report corresponding to application No. GB1214651.0, dated Dec. 5, 2012, 7 pages.
Search Report corresponding to application No. GB1214651.0, dated Apr. 25, 2013, 2 pages.
Combined Search and Examination Report corresponding to application No. GB1310153.0, dated Dec. 6, 2013, 9 pages.
Search and Examination Report corresponding to application No. GB1210064.0, dated Dec. 16, 2013, 9 pages.

* cited by examiner

VEHICLE STEERING

FIELD OF THE INVENTION

This invention relates to vehicle steering and particularly, but not exclusively, to steering in low traction conditions such as mud or snow. Aspects of the invention relate to a method, to a system and to a vehicle.

BACKGROUND

Vehicle steering relies upon friction between the vehicle tyres and the ground. Where high levels of friction are available, such as in normal highway driving, understeer and oversteer are seldom encountered. However where friction is reduced, as in mud or snow, the rate of turn of a vehicle may vary substantially from that indicated by steering angle, and in consequence the vehicle may understeer or oversteer.

In such circumstances, the experience of the vehicle driver plays an important part in retaining control of the vehicle and achieving the intended rate of turn.

A vehicle may include a cruise control mode whereby a pre-set speed is maintained regardless of topography. Cruise control systems are widely used in highway driving, generally above about 30 kph, where steering angles are typically small. Autonomous cruise control (ACC) systems permit one vehicle to follow another at a predetermined separation whilst accommodating speed variations of the leading vehicle.

Off-road cruise control has been proposed whereby a vehicle may maintain a pre-set speed over variable terrain. Such a system has the advantage that the vehicle driver, particularly a novice driver, can concentrate upon steering whilst allowing vehicle systems to automatically select a suitable transmission ratio and engine speed. Thus the work rate of the vehicle driver may be substantially reduced. However in the case of high steering angles on low friction surfaces some side slip (understeer) may occur, so that the vehicle does not follow the intended path. An inexperienced driver may not know how to best control the vehicle in such circumstances, in order to make progress whilst avoiding risk or damage.

Mere disengagement of a cruise control mode in difficult conditions places the inexperienced driver under a greater workload, since engine speed and transmission ratio must be controlled in addition to steering.

What is required is a system and method of providing for a prescribed rate of turn of a vehicle in low friction conditions and which is also suitable for use whilst in a cruise control mode.

SUMMARY OF THE INVENTION

According to one aspect of the present invention for which protection is sought, there is provided a method of steering a vehicle in cruise control mode, and comprising substantially continually:
  detecting steering angle;
  calculating a theoretical rate of turn of the vehicle appropriate to the detected steering angle; and
  controlling individually the speed of rotation of vehicle wheels to achieve the theoretical rate of turn.

Cruise control mode is intended to describe a vehicle system for automatically maintaining a selected vehicle speed regardless of topography.

Methods according to embodiments of the present invention may be considered to provide steering assistance to a driver. Thus some embodiments may be referred to as steering assist methods. Some embodiments in which steering assistance may be provided only at relatively low speeds may be referred to as low speed steering assist (or assistance) systems. Some embodiments may be referred to in addition or instead as off-road or off-highway steering assist systems.

In a further aspect of the invention for which protection is sought there is provided a method of steering a vehicle in a speed control mode, and comprising substantially continually:
  defecting steering angle;
  calculating a theoretical rate of turn of the vehicle appropriate to the detected steering angle; and
  controlling individually the speed of rotation of vehicle wheels to achieve the theoretical rate of turn.

According to one aspect of the invention for which protection is sought there is provided a method of steering a vehicle at low speed, and comprising substantially continually:
  detecting steering angle;
  calculating a theoretical rate of turn of the vehicle appropriate to the detected steering angle; and
  controlling individually the speed of rotation of vehicle wheels to achieve the theoretical rate of turn.

By low speed we mean less than about 50 kph. Low speed may be determined by a settable threshold of vehicle speed or by engagement of, for example, a low range in a vehicle transmission. In the latter case, a steering assist method according to an embodiment of the present invention may be automatically enabled upon selection of a low range, and the low range may be manually or automatically selected.

According to a further aspect of the invention for which protection is sought there is provided a method of steering a vehicle in a low transmission range, and comprising substantially continually:
  defecting steering angle;
  calculating a theoretical rate of turn of the vehicle appropriate to the detected steering angle; and
  controlling individually the speed of rotation of vehicle wheels to achieve the theoretical rate of turn.

A low transmission range provides a lower final drive gear ratio at the wheels, and is typically available for off-road use where lower maximum vehicle speed can be accepted.

According to an aspect of the invention for which protection is sought there is provided a method of steering a vehicle in low friction conditions and comprising substantially continually:
  detecting steering angle;
  calculating a theoretical rate of turn of the vehicle appropriate to the detected steering angle; and
  controlling individually the speed of rotation of vehicle wheels to achieve the theoretical rate of turn.

Low friction may be indicated by wheel slip of greater than 20%.

Optionally, the speed of rotation of a steering road wheel is controlled.

Optionally, the speed of rotation of all road wheels is controlled.

Optionally, the speed of rotation of vehicle wheels is controlled by braking one or more of said wheels.

Alternatively or in addition the speed of rotation of vehicle wheels may be controlled by variation of driving torque thereof.

Optionally, driving torque to one output of a differential gear is reduced.

Optionally, driving torque to one output of a differential gear is increased.

Optionally, driving torque is varied by adjustment of output torque of a vehicle motor.

Optionally the rate of turn of the vehicle is determined by a GPS system.

The method may be performed by a controller at a refresh rate of 10 Hz or greater.

The method may further comprise receiving a user input of a target speed at which the vehicle is intended to travel and causing the vehicle to operate in accordance with the target speed.

The method may comprise detecting a slip event between any one or more of the wheels and the ground over which the vehicle is traveling when the vehicle is in motion and providing a slip detection output signal in the event thereof; and
  maintaining the vehicle at the target speed independently of the slip detection output signal by applying torque to the at least one of the plurality of wheels.

The method may further comprise:
  suspending operation of the vehicle in the speed control mode in the event that the current speed is determined to be in excess of a predetermined threshold speed.

Optionally the predetermined threshold speed is between 25 and 35 mph.

Further optionally the predetermined threshold speed is substantially 30 mph.

Optionally, the predetermined threshold speed is a first, lower threshold speed, the method further comprising:
  comparing the current vehicle speed with a second, higher threshold speed and, if the current vehicle speed is less than the second, higher threshold speed, holding the vehicle speed control system in a wait state and initiating vehicle speed control only once the current vehicle speed is reduced to below the first, lower threshold speed.

The method may further comprise controlling the vehicle to operate in a cruise control mode.

Controlling the vehicle to operate in the cruise control mode may comprise maintaining the vehicle speed at speeds above the predetermined threshold speed.

The method may comprise suspending operation of the cruise control mode on receiving the slip detection output signal.

The may further comprise:
  detecting the nature of the terrain over which the vehicle is traveling;
  determining whether the target speed is appropriate for the nature of the terrain over which the vehicle is traveling; and
  maintaining the vehicle at the target speed by applying torque to the at least one of the plurality of wheels only if the target speed is determined to be appropriate.

The speed control mode may be a low-speed speed control mode operable only below a threshold vehicle speed.

The threshold vehicle speed may be less than a maximum operating speed of a highway cruise control system. The threshold speed may be in the range from around 30 to 60 kph, optionally in the range of from 45 to 55 kph, optionally substantially 50 kph.

Optionally, the speed control mode is an off-road speed control mode operable only below a threshold vehicle speed. The threshold speed may be in the range from around 30 to 60 kph, optionally in the range from 45 to 55 kph, optionally substantially 50 kph.

It is to be understood that the off-road speed control system may differ from an on-highway speed control system at least in part in that the off-road speed control system does not cancel operation in response to detection of wheel slip. In contrast, known on-highway cruise control systems are configured to cancel operation in response to detection of wheel slip. For example, if a stability control system (SCS) detects occurrence of wheel slip sufficient to require intervention by the SCS, known on highway speed control systems are configured to cancel their operation.

Optionally, when the vehicle is operating in the speed control mode the speed control mode is not cancelled in response to a wheel slip event.

It is to be understood that the speed control system may be operable to manage slip of one or more wheels when slip is detected in order to initiate and/or maintain motion of the vehicle over a surface.

In a further aspect of the invention for which protection is sought there is provided a control system of a vehicle having a speed control mode, the system including a processor having inputs of steering angle and rotational speed of steering wheels, the processor being adapted in the speed control mode to repeatedly calculate theoretical vehicle rate of turn with respect to steering angle, and to control individually vehicle wheel speed to achieve said theoretical rate of turn.

Rate of turn may also be referred to as 'yaw rate', or simply 'yaw'.

Said processor may be further adapted to compare theoretical vehicle yaw with actual vehicle yaw and to control individually vehicle wheel speeds such that actual vehicle yaw approaches theoretical vehicle yaw.

The system may be operable at low speed, and include a processor having inputs of steering angle and rotational speed of steering wheels, the processor being adapted to repeatedly calculate theoretical vehicle yaw with respect to steering angle, and to control individually vehicle wheel speed to achieve said theoretical yaw.

Optionally said processor is further adapted to compare theoretical vehicle yaw with actual vehicle yaw and to control individually vehicle wheel speeds such that actual vehicle yaw approaches theoretical vehicle yaw.

The system according may comprise:
  means for receiving a user input of a target speed at which the vehicle is intended to travel; and
  means for causing the vehicle to operate in accordance with the target speed by applying torque to the at least one of the plurality of wheels.

The system may further comprise:
  means for detecting a slip event between any one or more of the wheels and the ground over which the vehicle is traveling when the vehicle is in motion and for providing a slip detection output signal in the event thereof;
  means for maintaining the vehicle at the target speed independently of the slip detection output signal.

Optionally, the means for maintaining the vehicle speed at the target speed includes:
  means for determining a current speed at which the vehicle is traveling;
  means for comparing the current speed with the target speed and for providing an output indicative of the difference between the current speed and the target speed; and
  means for evaluating the torque to be applied to at least one of the vehicle wheels in dependence on the output.

The means for applying torque may be arranged to apply torque to at least two wheels of the vehicle simultaneously.

The means for applying torque may be arranged to apply torque to at least four wheels of the vehicle simultaneously.

The system may further comprise:
  means for inhibiting operation of the vehicle control system in the event that the current speed is determined to be in excess of a predetermined threshold speed.

Optionally, the predetermined threshold speed is between 25 and 35 mph.

Further optionally, the predetermined threshold speed is substantially 30 mph.

The predetermined threshold speed is optionally a first, lower threshold speed, the vehicle speed control system further comprising:
- means for comparing the current vehicle speed with a second, higher threshold speed and, if the current vehicle speed is less than the second, higher threshold speed, holding the vehicle speed control system in a wait state and initiating vehicle speed control only once the current vehicle speed is reduced to below the first, lower threshold speed.

The system may further comprise a cruise control system which is operable to maintain vehicle speed at speeds above the predetermined threshold speed.

The cruise control system may comprise means for suspending operation of the system on receiving the slip detection output signal.

The system may further comprise:
- means for detecting the nature of the terrain over which the vehicle is traveling;
- means for determining whether the target speed is appropriate for the nature of the terrain over which the vehicle is traveling; and
- means for maintaining the vehicle at the target speed by applying torque to the at least one of the plurality of wheels only if the target speed is determined to be appropriate.

In an aspect of the invention for which protection is sought there is provided a steering system operable in a low vehicle transmission range, and including a processor having inputs of steering angle and rotational speed of steering wheels, the processor being adapted to repeatedly calculate theoretical vehicle yaw with respect to steering angle, and to control individually vehicle wheel speed to achieve said theoretical yaw.

Optionally said processor is further adapted to compare theoretical vehicle yaw with actual vehicle yaw and to control individually vehicle wheel speeds such that actual vehicle yaw approaches theoretical vehicle yaw.

In an aspect of the invention for which protection is sought there is provided a steering system operable upon detection of low friction terrain, and including a processor having inputs of steering angle and rotational speed of steering wheels, the processor being adapted to repeatedly calculate theoretical vehicle yaw with respect to steering angle, and to control individually vehicle wheel speed to achieve said theoretical yaw.

Optionally said process is further adapted to compare theoretical vehicle yaw with actual vehicle yaw and to control individually vehicle wheel speeds such that actual vehicle yaw approaches theoretical vehicle yaw.

Said processor may be adapted to control engine output torque.

Optionally, said processor is adapted to control vehicle wheel speed by braking.

Said processor may be adapted to determine driving torque applied to opposite wheels of an axle.

In an aspect of the invention for which protection is sought there is provided a vehicle incorporating a system according to a preceding aspect.

Methods according to embodiments of the present invention may provide an open loop system whereby vehicle wheel speeds are determined according to the theoretical rate of turn. Feedback is provided by active input to the steering wheel by the vehicle driver—in other words driver demand may change the theoretical rate of turn according to change of steering angle; the driver may for example increase the steering angle if the vehicle rate of turn does not match driver expectation.

In embodiments of the present invention, closed loop control may be achieved by determining a current rate of turn of the vehicle, and controlling individually the speed of rotation of vehicle wheels such that the current (real time) rate of turn approaches the theoretical rate of turn.

Methods according to embodiments of the present invention may also be used in combination, so that a plurality of conditions may require to be met for implementation of the method. For example cruise control and low friction, or cruise control and low range, may be a required combination. More than two conditions may apply in a desirable combination, which may be vehicle specific.

Methods according to embodiments of the present invention may rely upon an iterative approach, and sample the inputs of steering angle and current rate of turn at an appropriate refresh rate, for example 10 Hz or greater. The speed of rotation of individual wheels may be directly reduced, or braking, or may be adjusted by directing more or less torque to the relevant wheel driveshaft. Torque variation may rely upon automatically increasing engine output torque and/or by using techniques of biasing torque to one or more vehicle axles, or to one or other wheel side of a single axle. Torque bias may for example be achieved by controlling one or more differential gears so that the output shafts thereof deliver different torques to the respective wheels. This torque may be redistributed between driven wheels of the vehicle, and the available torque may be automatically increased or reduced by adjustment of the torque output of the vehicle motor. The vehicle motor may be an internal combustion engine, an electric motor or a combination thereof.

Methods according to embodiments of the present invention are also applicable to vehicles having electric wheel motors.

Aspects of the present invention are applicable to both on-road and off-road driving, and may be implemented automatically by a vehicle system upon detection of certain adverse conditions. Thus, regardless of whether a speed control system is operational, steering assistance according to some embodiments of the invention may be provided automatically. Alternatively, or in addition, the methods may be selected or de-selected manually by a vehicle driver.

Adverse conditions may be any circumstance in which side slip is present or is predicted. Such conditions may be detected automatically by on-board vehicle systems, and include for example detection of wheel slip, and failure of the vehicle to follow the prescribed path, in each case the adverse condition may be subject to a threshold being exceeded, for example wheel slip exceeding a predetermined percentage, and the threshold may be variable depending on the terrain or upon driver implementation of a terrain mode of the vehicle.

Thus an off-road mode may be automatically detected or manually selected, and in consequence certain thresholds may be determined, from e.g. a look-up table in a memory of a processor. Different thresholds may apply for different off-road terrain conditions, such as sand, mud, snow or rocks—and these terrains may be detected automatically by a suitable on-board vehicle system.

In the case of on-road low speed driving, where wheel slip is typically very low, the speed of individual vehicle wheels is monitored. These speeds may be compared with steering angle to ensure that they remain within a narrow permissible range (it being understood that inside wheels turn more slowly than outside wheels during cornering). A plurality of wheel speeds may be interpolated to allow determination of vehicle speed.

In the case of off-road driving, significant wheel slip may occur and accordingly an alternative vehicle speed reference is required where embodiments of the present invention, are applied to a speed control or cruise control mode.

In one embodiment, the method is applied to a speed control mode whereby vehicle reference speed is determined without reference to vehicle wheel speed(s), for example by use of GPS positioning, fixed object radar, sonar laser, camera recognition of terrain passing under the vehicle, or any other suitable technique, or any combination of these techniques.

In one embodiment, a method according to an embodiment of the present invention composes a closed loop control system. Thus in one example one or more inside wheels of the vehicle is braked to counter understeer. Such braking may be incorporated within a closed loop control system, whereby the theoretical and current rates of turn are continually compared, braking being applied in proportion to the deviation to be corrected. Closed loop control may operate at any suitable refresh rate, for example 10 Hz or greater.

In the alternative en open loop control system may be employed in embodiments of the present invention. Using the same example one or more inside vehicle wheels may be braked until the vehicle steering angle is changed the vehicle driver thus provides a control input, and a recalculation of deviation from the intended path follows. A further braking input may follow if the vehicle deviation is not successfully corrected.

Embodiments of the present invention allow a cruise control mode to be adopted, so that the driver can concentrate on steering the vehicle whilst maintaining progress in challenging terrain.

The theoretical rate of turn may be represented as a vehicle body yaw and side slip which can be mapped to the slip angles and speeds of individual wheels. If required, an instant reference position of the vehicle may repeatedly or continuously be provided by any known technique, for example by GPS positioning, fixed object radar, sonar laser, or camera recognition of terrain passing under the vehicle. Reference position may be useful in some embodiments of the invention.

The expected vehicle yaw rate, as a consequence of steering angle, may be repeatedly compared with an actual (measured) yaw rate in order to determine side slip, and thus to permit calculation of a correction factor whereby vehicle wheel speed is adjusted.

Vehicle speed may be determined by an averaging technique of the rotational speeds of two or more vehicle wheels, for example in conjunction with the reference position techniques noted above. The averaging technique may be applied to undriven wheels and/or to non-steering wheels. However it will be understood that vehicle speed, as such, is optional, and not a necessary input for correcting side slip in a method or system according to an embodiment of the present invention.

Thus embodiments of the present invention allows for optimised steering response by providing that individual wheel speeds are appropriate to the steering angle, and particularly where the steering wheels are driven. The vehicle driver retains full control of steering, and the vehicle automatically forces appropriate wheel speeds by braking, or by applying more or less drive torque to the intent that the desired vehicle path is followed, particularly in low speed off-road conditions where cruise control is activated.

Embodiments of the present invention have the advantage of reducing tyre wear, due to restricting unnecessary wheel spinning as a result of excess drive torque, and of reducing damage to the terrain caused by spinning wheels.

In an embodiment of the invention, a hybrid vehicle may provide increased torque to one or more wheels via an electric traction motor, in order to supplement an internal combustion engine.

In one embodiment an electronic control unit of the vehicle determines the vehicles target speed according to a cruise control input, detects the instant steering angle, and calculates the expected yaw angle of the vehicle on the assumption that sufficient friction is available to permit the vehicle wheels to follow the path dictated by the steering angle. The expected yaw angle is compared with a detected yaw angle, and convergence is initiated by controlling individual wheel speeds.

In another embodiment, the ECU determines the theoretical individual wheel speeds required for a prescribed rate of turn corresponding to the instant steering angle, and compares these theoretical wheel speeds with actual wheel speeds. Individual wheel speeds are in consequence controlled to ensure convergence, by braking or directing increased torque to the or each respective wheel driveshaft.

Vehicle yaw may be sensed by any suitable technique, including GPS, fixed object radar, camera recognition of terrain and onboard accelerometers or a gyro. Wheel speed may be determined in any conventional manner, including use of systems associated with anti-lock, braking.

In one embodiment, a method according to an embodiment of the invention is implemented in response to defection of an off-road condition, for example by reference to selection of an off-road vehicle operating condition, selection of a low transmission range, selection of a raise of suspension setting, or detection of high suspension travel. A method according to an embodiment of the invention may also be implemented upon detection of wading by any suitable wading sensor.

Within the scope of this application if is expressly intended that the various aspects, embodiments, examples and alternatives set out in the preceding paragraphs, in the claims and/or in the following description and drawings, and in particular the individual features thereof, may be taken independently or in any combination. For example, features described with reference to one embodiment are applicable to all embodiments, unless such features are incompatible.

Within the scope of this application it is expressly envisaged that the various aspects, embodiments, examples and alternatives set cut in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
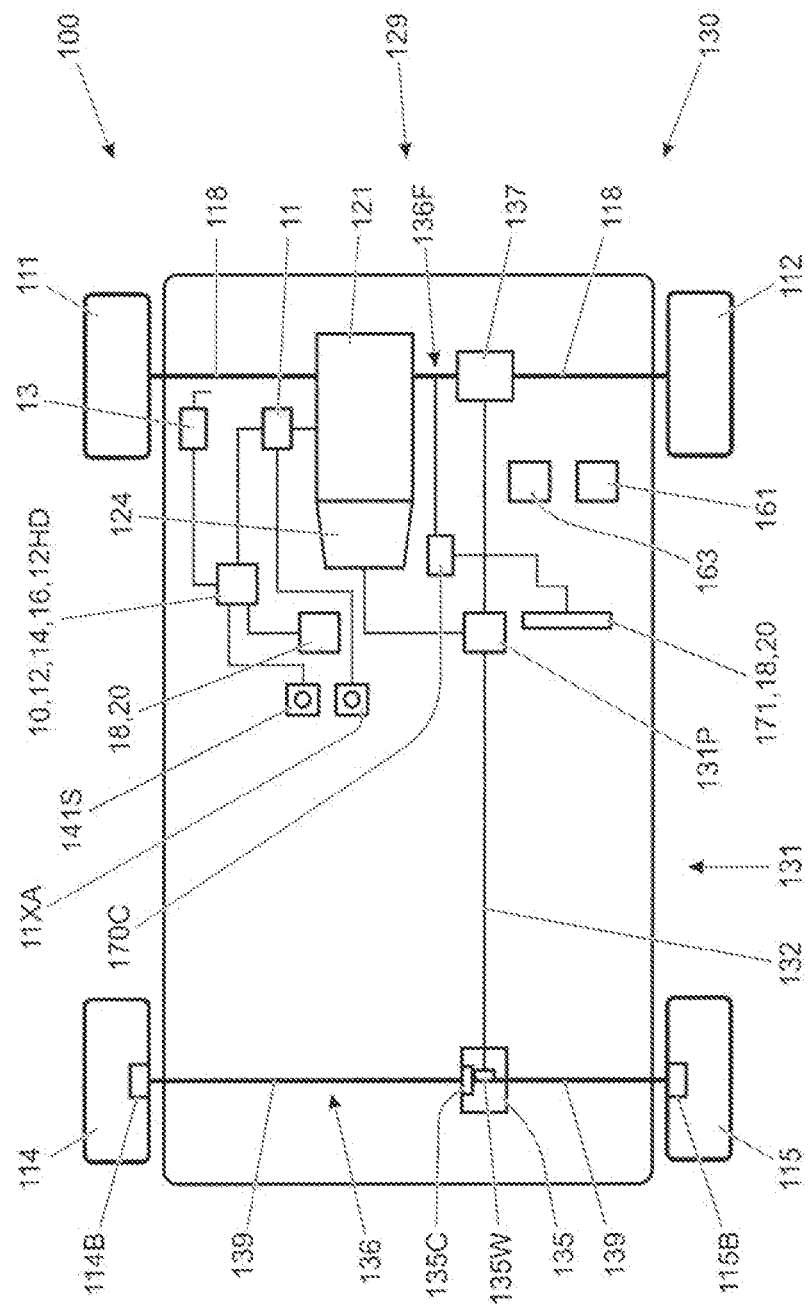
FIG. 1 is a schematic illustration of a vehicle according to an embodiment of the invention in plan view.
Figure 2:
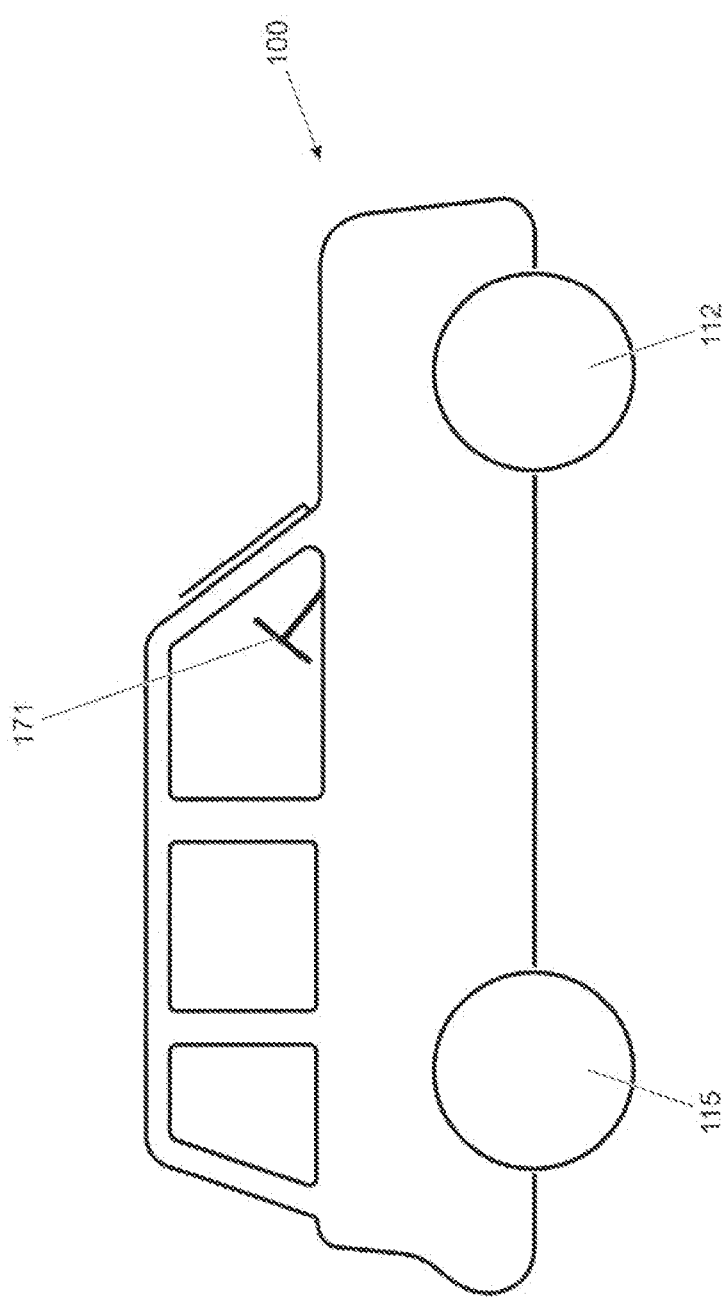
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or propshaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
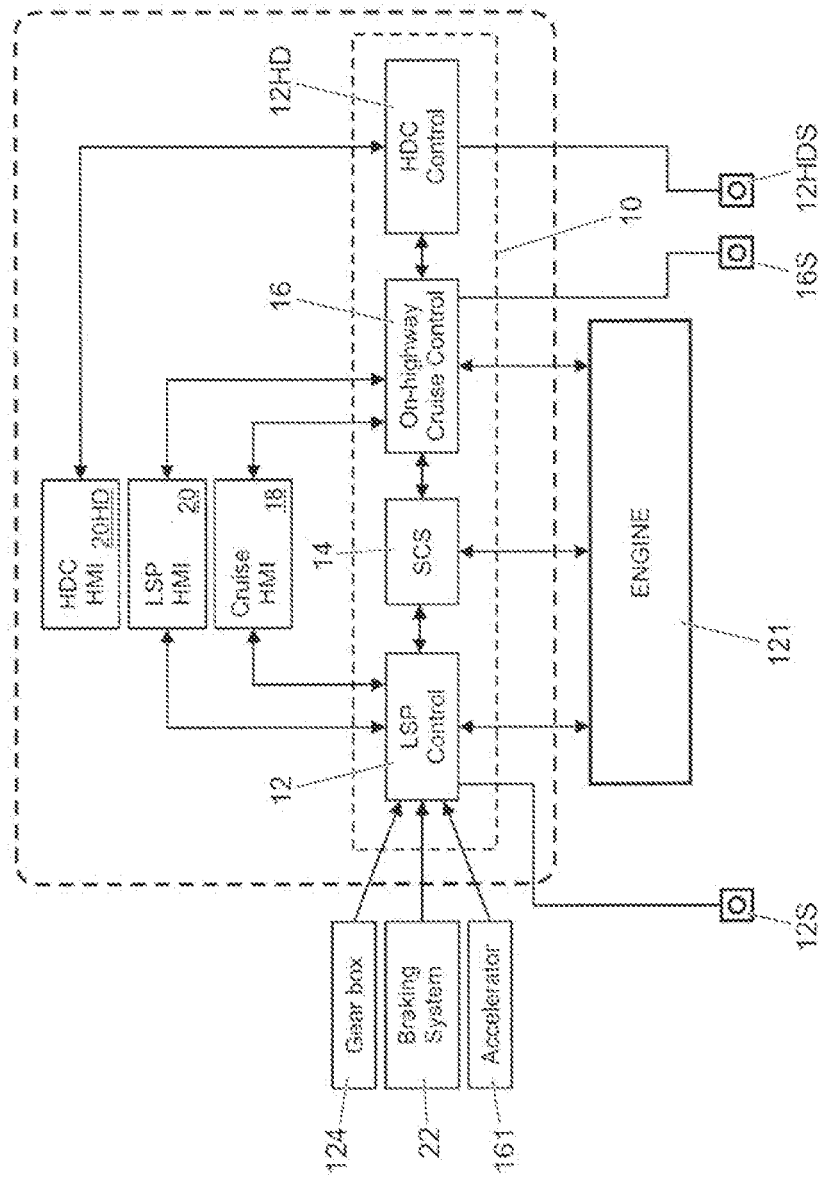
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 reserves and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing less of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
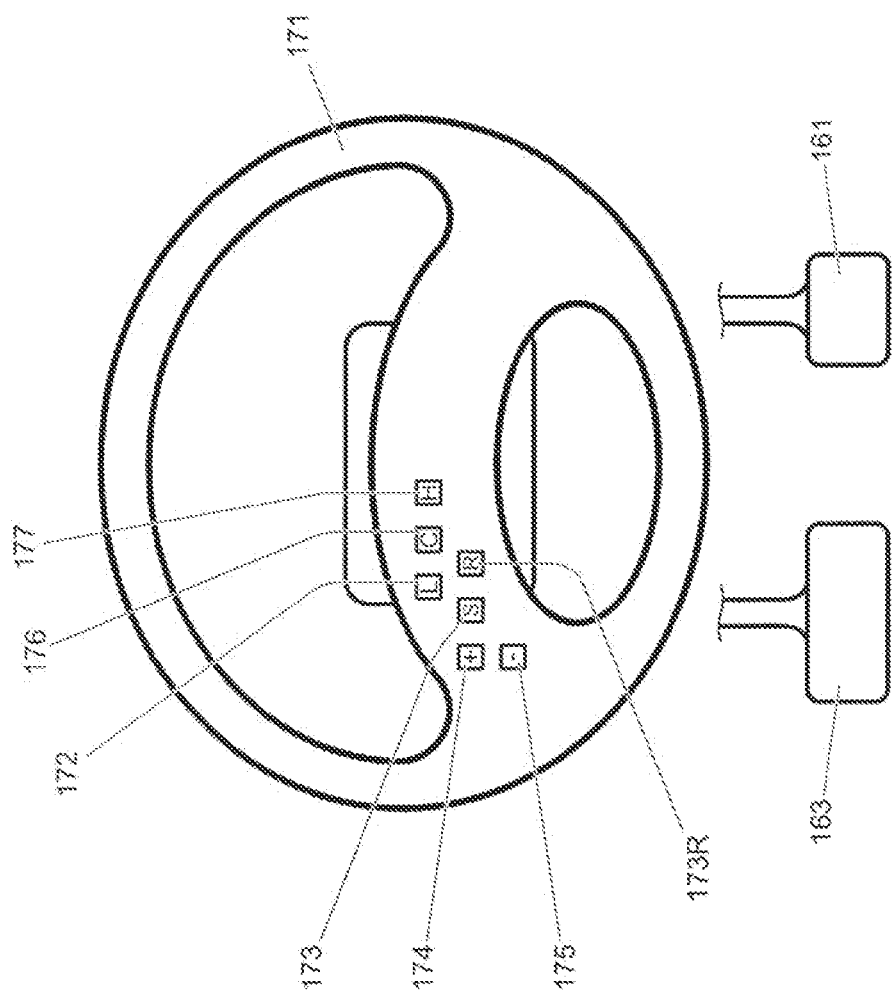
FIG. 5 illustrates a steering wheel and brake and accelerator pedals of a vehicle according to an embodiment of the present invention.

As noted above, the vehicle 100 also includes a cruise control system 16 which is operable to automatically maintain vehicle speed at a selected speed when the vehicle is traveling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that in the event that the user depresses a brake pedal 163 or, in the case of vehicles with a manual transmission, a clutch pedal (not shown), the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI in the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, fraction control and braking actions to one or more wheels of the vehicle 100, collectively or individually, to maintain the vehicle 100 at the desired speed.

The LSP control system 12 is configured to allow a user to input a desired value of set-speed parameter. LSP_set-speed to the LSP control system 12 via a low-speed progress control HMI (LSP HMI) 20 (FIG. 1, FIG. 3) which shares certain input buttons 173-175 with the cruise control system 16 and a hill descent control (HDC) control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of the HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is traveling at a speed of 50 kph or less and no other speed control system is in operation, the HDC system 12HD sets the value of HDC_set-speed to a value selected from a look-up table. The value output by the look-up table is determined in dependence on the identify of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms−2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is traveling at a speed exceeding 50 kph, the HDC system 12HD ignores the request and provides an indication to the user that the request has been ignored due to vehicle speed being above the limit for operation of the system 12HD.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls unless the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst traveling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is traveling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
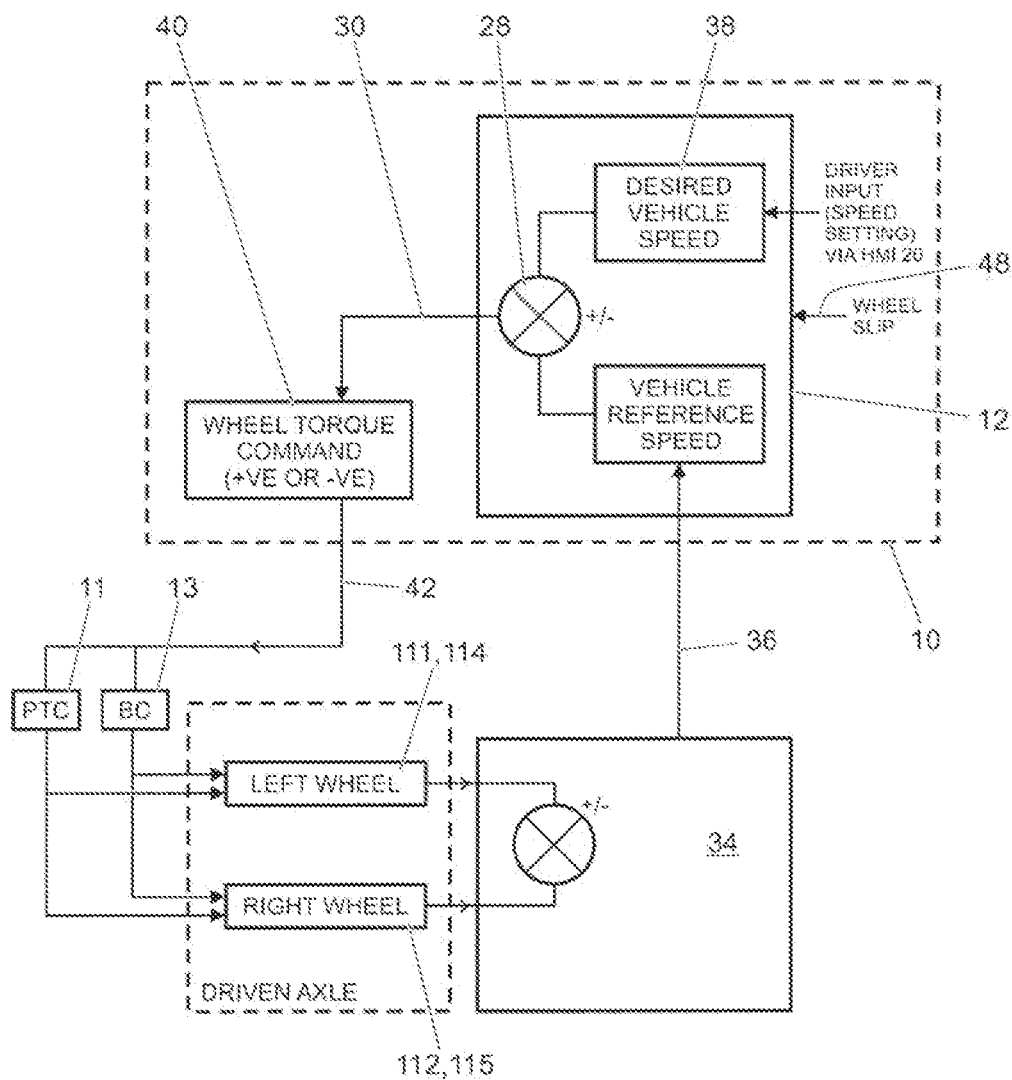
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 39 (also referred to as a 'target speed' 38) selected by the user with the measured speed 36 and provides an output signal 30 indicative of the comparison. The output signal 30 is provided to an evaluates unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 128 to one or more wheels by the electric machine. Negative torque may also be applied by means of engine braking in some circumstances, depending at least in part on the speed at which the vehicle 100 is moving. If one or more electric machines are provided that ere operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque, in order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels, individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the around over which it is traveling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16. In some arrangements the SCS 14 provides the wheel slip event signal 48 to the LSP control system 12 or cruise control system 16 depending on which system is operating at the time. In some arrangements the SCS 14 broadcasts the signal 48 on a controller area network (CAN) bus (not shown) with which the LSP control system 12 and cruise control system 16 are in communication, whereby the systems 12, 16 may detect the signal 48.

A wheel slip event is triggered when a loss traction occurs at any one of the vehicle wheels. Wheels and tyres may be more prone to losing traction when traveling for example on snow, ice, mud or sand and/or on steep gradients or cross-slopes. A vehicle 100 may also be more prone to losing fraction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation by the user in such conditions can be a difficult and often stressful experience and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is traveling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water defection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is traveling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB1111288.5, GB1211910.3 and GB1202427.9, the contents of each of which is incorporated herein by reference.

The nature of the terrain over which the vehicle is traveling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is traveling, the system 12 is operable to automatically adjust the vehicle speed downwards by reducing the speed of the vehicle wheels. In some cases, for example, the user selected speed may not be achievable or appropriate over certain terrain types, particularly in the ease of uneven or rough surfaces. If the system 12 selects a set-speed that differs from the user-selected set-speed, a visual indication of the speed constraint is provided to the user via the LSP HMI 20 to indicate that an alternative speed has been adopted.

Figure 6:
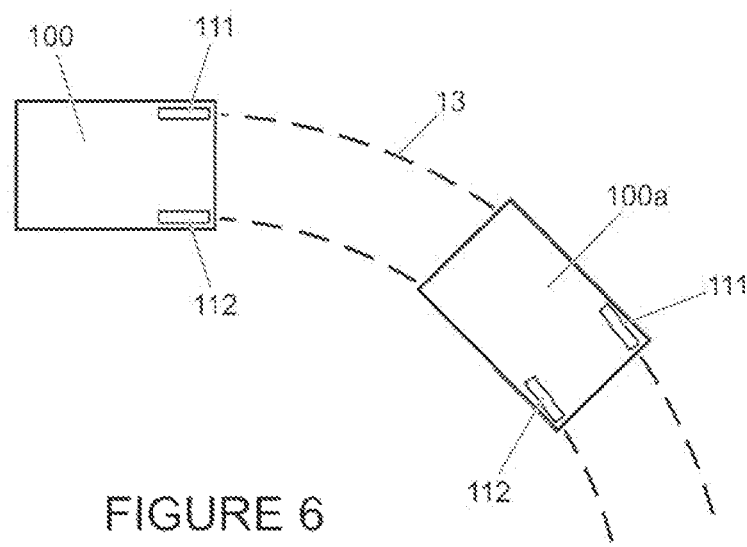
FIG. 6 illustrates the turning path of a vehicle in plan view on a high friction surface.

With reference to FIG. 6, the vehicle 100 of FIG. 1 is illustrated in a straight ahead condition, with the left and right steering road wheels 111, 112 parallel. By turning the vehicle steering wheel 171, the wheels 111, 112 will generally adopt a non-parallel condition and cause the vehicle to follow a curve, as illustrated by the dotted line path 13 and vehicle at position 100*a*.

The representation of FIG. 6 implies a high friction surface between the road wheels 111, 112, 114, 115 and the ground, so that side slip of the vehicle 100 is negligible—in consequence the vehicle 100 follows the intended path very closely. In other words, the vehicle experiences substantially zero understeer and oversteer.

Figure 7:
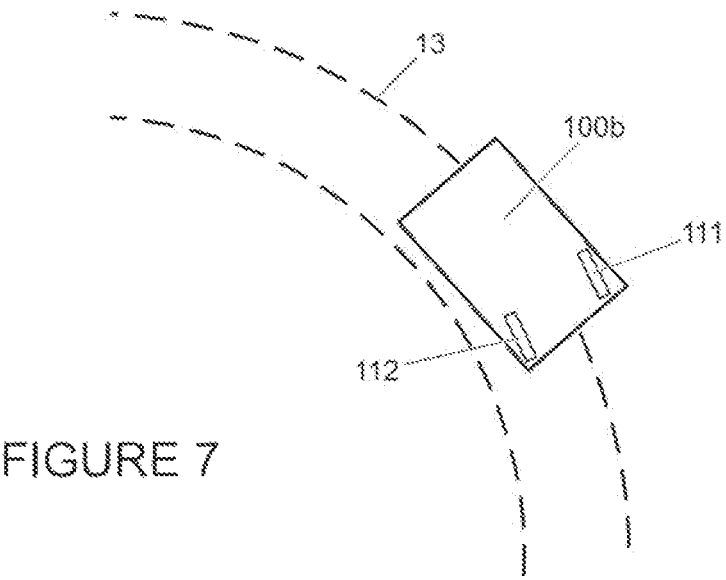
FIG. 7 illustrates the turning path of a vehicle in plan view on a low friction surface.

FIG. 7 illustrates what may happen on a low friction ground surface such as snow or sand. In this case, and somewhat dependent on vehicle speed, the vehicle 100*b* will tend to slip sideways as the components of turning force are resolved.

The vehicle 100b will follow a less tight curve (so-called understeer) and does not follow the theoretical vehicle path 13 associated with the steering wheel input of the driver.

Figure 8:
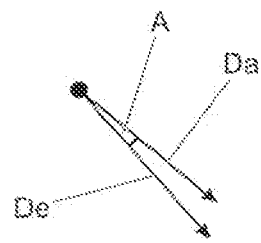
FIG. 8 illustrates the instant angle between desired direction of travel and actual direction of travel.

The instant relative directions of the vehicle are shown in FIG. 8 where expected direction De, and actual direction Da are separated by a side slip angle A.

It will be understood that in the case of the scenario of FIG. 6, the steering wheels 111, 112 will have different rotational speeds as they follow the curved path 13 corresponding to the instant steering angle.

The VCU 10 of the embodiment of FIG. 1 is operable to implement a 'steering assist mode' when the LSP control system 12 is in operation. When the steering assist mode is in operation, the VCU 10 seeks to cause the vehicle 100 to follow a path corresponding substantially to that expected for the instant steering angle in the absence of wheel slip, in the scenario of FIG. 6, the VCU 10 would attempt to cause the vehicle 100 to follow path 13 regardless of the nature of the terrain or other surface conditions.

The expected speeds of rotation of the steering wheels 111, 112 for the instant steering angle in the absence of understeer or oversteer are directly computed by the VCU 10 from information regarding vehicle steering geometry and steering angle (provided by steering controller 170C). In some embodiments the speeds are provided in a look-up table of a memory of the steering controller 170C or VCU 10. The theoretical road wheel speeds for the current steering angle are compared with actual road wheel speeds by the VCU 10 in order to determine whether the vehicle 100 is following the intended path.

If the VCU 10 determines that side slip angle A is non-zero (FIG. 8), the VCU 10 increases the rate of turn of the vehicle 100 by speeding up the outer steerable road wheel 111 relative to the inner road wheel 112. In some embodiments the VCU 10 may in addition or instead slow the inner road wheel 112 with respect to the outer mad wheel 112. Thus the vehicle 100 may be forced to more closely approach the theoretical path 13, and correct the side slip tendency. In the present embodiment, when the LSP control system 12 is active the VCU 10 attempts to cause the vehicle 100 to follow a path corresponding substantially to the expected path for substantially zero understeer and oversteer. Reference to inner and outer road wheels is to be understood to be inner and outer roadwheels with respect to a direction of turn of the vehicle 100.

It is to be understood that speeding up of one or more vehicle wheels may be particularly effective in low friction conditions, since traction may be gained in some driving conditions by deliberately forcing a degree of slip in the range 5-20%, depending upon the nature of the terrain. A different degree of slip may be desirable in for example mud, gravel, sand and snow, and may also be varied depending on the quality of the terrain, for example soft or hard-packed snow.

In the embodiment of FIG. 1 adjustment of differential road wheel speed is made in respect of the vehicle steering axle (the front axle) by controlling the speed of front wheels 111, 112. Alternatively or in addition, in some embodiments adjustment of road wheel speed may be made in respect of a non-steering axle (in the embodiment of FIG. 1 this being the rear axle) by controlling the speed of wheels 114, 115 of the non-steering axle.

Wheel speed adjustment may be provided by any suitable means. Where a reduction in a wheel speed is required, a brake may be applied to the wheel. Alternatively the amount of torque applied to the wheel may be varied, to speed up or slow down the wheel. In the latter case torque variation may be by adjustment of the torque split in a differential gear of an axle, and may be accompanied by an increase or a reduction of vehicle engine (and/or other motor) output torque. The latter may be accomplished by variation of an engine torque/speed map within a suitable control processor of the vehicle 100. In the embodiment of FIG. 1 the powertrain controller 11 is provided with the engine torque/speed map.

In the present embodiment, vehicle position relative to the intended path (i.e. the path corresponding to the instant steering angle for substantially zero wheel slip) is detected by means of a radar system that detects movement of the vehicle 100 relative to fixed objects. The VCU 10 receives information in respect of vehicle movement from a radar controller coupled to radar transmit/receive devices (not shown).

In some alternative embodiments vehicle position relative to intended path may be calculated in any other suitable manner, so that a reference position may be compared with a current position, and a correction applied automatically.

In some embodiments, GPS positioning systems or camera recognition techniques may be employed. Analysis of relative wheel speeds of non-steering axles may be employed in addition or instead in some embodiments. In some embodiments, a simplified open-loop system correction is applied by the vehicle driver changing the steering angle. Thus, in some embodiments the VCU 10 may cause a differential wheel speed between wheels of an axle to correspond substantially to that expected in the case of substantially zero understeer or oversteer. If the vehicle continues to experience understeer or oversteer despite this, the driver may cause the vehicle to follow the desired path by increasing (or decreasing) steering angle depending on whether understeer (or oversteer) is encountered.

Although understeer is illustrated in FIG. 7, as noted above embodiments of the present invention are equally applicable to correction of oversteer, in which condition the vehicle 100 turns through a greater angle than demanded by the vehicle driver. Where a non-zero oversteer angle is detected (corresponding to a negative angle of understeer), the VCU 10 again adjusts differential road wheel speed in respect of the front axle by controlling the speed of front wheels 111, 112 in order to reduce oversteer substantially to zero.

As described above, the VCU 10 is configured to implement a known Terrain Response (TR)® System in which the VCU 10 controls settings of one or more vehicle systems or sub-systems such as the powertrain controller 11 in dependence on a user-selected driving mode or (in an automatic TR mode) the most appropriate mode for the prevailing driving conditions as determined by the VCU 10. Thus, in the automatic TR mode, terrain type may be detected automatically by an on-board vehicle system. In a manual TR mode, a user may manually select TR mode based on visual appearance of terrain. Where a quality of a given type of terrain influences the desirable degree of forced wheel slip for optimum fraction, the vehicle driver may be presented with options, for example soft, medium or hard-packed sand, and the driver requested to select the most appropriate option. Such options may however be resolved automatically by the VCU 10 or other vehicle system responsive to terrain recognition in the automatic TR mode.

In some embodiments, the VCU 10 may be operable to implement control of differential wheel slip across an axle in response to driver selection of a 'steering assist mode', regardless of whether the LSP control system 12 is in operation. Thus in some embodiments a steering assist mode selector dial may be provided by means of which a user may select steering assist mode. In some embodiments, the steering assist mode may be selectable from a software menu.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of steering a vehicle in a speed control mode, and comprising substantially continually:
    detecting steering angle;
    calculating a theoretical rate of turn of the vehicle appropriate to the detected steering angle; and
    controlling individually the speed of rotation of vehicle wheels to achieve the theoretical rate of turn;
    wherein the speed of rotation of the vehicle wheels is controlled by variation of driving torque thereof, and
    wherein the variation of driving torque comprises increasing or reducing the driving torque to one output of at least one of a differential gear and a driveline clutch.

2. A method according to claim 1, and further comprising determining a current rate of turn of the vehicle; and
    controlling said speed of rotation such that the current rate of turn approaches the theoretical rate of turn.

3. A method according to claim 1 operable when the vehicle is travelling at one of: a low speed; in a low transmission range; and in low friction conditions.

4. A method according to claim 1, wherein the speed of rotation of a steering road wheel is controlled.

5. A method according to claim 1 further comprising receiving a user input of a target speed at which the vehicle is intended to travel and causing the vehicle to operate in accordance with the target speed.

6. A method according to claim 1, further comprising:
    suspending operation of the vehicle in the speed control mode in the event that the current speed is determined to be in excess of a predetermined threshold speed.

7. A method according to claim 1, further comprising:
    controlling the vehicle to operate in a highway cruise control mode wherein controlling the vehicle to operate in the highway cruise control mode comprises maintaining the vehicle speed at speeds above the predetermined threshold speed, and
    suspending operation of the highway cruise control mode on receiving the slip detection output signal.

8. A method according to claim 1 further comprising:
    detecting the nature of the terrain over which the vehicle is travelling;
    determining whether the target speed is appropriate for the nature of the terrain over which the vehicle is travelling; and
    maintaining the vehicle at the target speed by applying torque to the at least one of the plurality of wheels only if the target speed is determined to be appropriate.

9. A control system for steering a vehicle in a speed control mode, the system including a processor having inputs of steering angle and rotational speed of steering wheels, the processor being operable when in the speed control mode to repeatedly calculate theoretical vehicle rate of turn with respect to steering angle, and to control individually vehicle wheel speed to achieve said theoretical rate of turn, wherein the speed of rotation of vehicle wheels is controlled by variation of driving torque thereof, and variation of driving torque comprises increasing or reducing the driving torque to one output of at least one of a differential gear and a driveline clutch.

10. A system according to claim 9, wherein said processor is further operable to compare theoretical vehicle rate of turn with actual vehicle rate of turn and to control individually vehicle wheel speeds such that actual vehicle rate of turn approaches theoretical vehicle rate of turn.

11. A system according to claim 9 wherein the processor is operable to:
    receive a user input of a target speed at which the vehicle is intended to travel; and
    cause the vehicle to operate in accordance with the target speed by applying torque to the at least one of the plurality of wheels.

12. A system according to claim 11 wherein the processor is operable to:
    detect a slip event between any one or more of the wheels and the ground over which the vehicle is travelling when the vehicle is in motion and provide a slip detection output signal in the event thereof; and
    maintain the vehicle at the target speed independently of the slip detection output signal.

13. A system as described in claim 12, wherein the processor is operable to maintain the vehicle speed at the target speed by:
    determining a current speed at which the vehicle is travelling;
    comparing the current speed with the target speed and providing an output indicative of the difference between the current speed and the target speed; and
    evaluating the torque to be applied to at least one of the vehicle wheels in dependence on the output.

14. A system as described in claim 13, wherein the processor is operable to command the application of torque to at least two wheels of the vehicle substantially simultaneously.

15. A system as described in claim 12, wherein the processor is further operable to:
    inhibit operation of the vehicle speed control system in the event that the current speed is determined to be in excess of a predetermined threshold speed.

16. A system as described in claim 15, wherein the predetermined threshold speed is a first, lower threshold speed, the processor being further operable to:
    compare the current vehicle speed with a second, higher threshold speed and, if the current vehicle speed is less than the second, higher threshold speed, hold the vehicle speed control system in a wait state and initiate vehicle speed control only once the current vehicle speed is reduced to below the first, lower threshold speed.

17. A system as described in claim 15, further comprising a highway cruise control system which is operable to maintain vehicle speed at speeds above the predetermined threshold speed.

18. A system as described in claim 17, wherein the highway cruise control system is operable to suspend operation of the system on receiving the slip detection output signal.

19. A system as described in claim 9, further operable to:
    detect the nature of the terrain over which the vehicle is travelling;

and wherein the processor is operable to determine whether the target speed is appropriate for the nature of the terrain over which the vehicle is travelling; and maintain the vehicle at the target speed by applying torque to the at least one of the plurality of wheels only if the target speed is determined to be appropriate.

20. A vehicle incorporating the system of claim 9.

21. A method according to claim 1, wherein the calculated theoretical rate of turn of the vehicle appropriate to the detected steering angle comprises an expected rate of turn of the vehicle for the detected steering angle in the absence of wheel slip.

* * * * *